Figure 1:
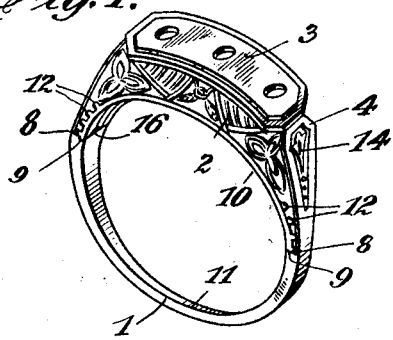

March 19, 1929.  T. MOUNTFORD  1,705,992

FINGER RING AND METHOD OF CONSTRUCTING AND ASSEMBLING THE SAME

Filed Dec. 17, 1923

INVENTOR
Thomas Mountford
BY
Edmunds
ATTORNEY

Patented Mar. 19, 1929.

1,705,992

UNITED STATES PATENT OFFICE.

THOMAS MOUNTFORD, OF NEWARK, NEW JERSEY, ASSIGNOR TO BLANCARD & CO., INC., OF NEWARK, NEW JERSEY, A CORPORATION OF NEW JERSEY.

FINGER RING AND METHOD OF CONSTRUCTING AND ASSEMBLING THE SAME.

Application filed December 17, 1923. Serial No. 681,076.

This invention relates to finger rings and to methods of constructing and assembling the same, and more particularly concerns finger ring construction involving separate ornamental side pieces attached to a ring shank. Such ornamental side pieces are customarily secured to the ring shank by soldering them thereto, and in order that the side pieces will be attached in absolutely accurate position, which is essential, it has been customary first to bind the side pieces to the ring shank temporarily with wire in an attempt to maintain the side pieces in the proper location while the soldering operation is accomplished. By reason of the small size of the parts and the degree of accurate positioning required, it is practically impossible to hold the side pieces in place while the soldering operation is performed. Even with the expedient of temporary wiring the side pieces are apt to slip out of position before the soldering operation has been completed, and in such cases the side pieces must be relocated. It has also been proposed to construct finger rings of two complementary halves, each half comprising one-half of the ring shank with a side piece portion integral therewith, and then soldering the two halves together flat wise. This method of construction, however, produces a line of solder about the entire periphery of the ring and this is very objectionable for many reasons which are well known to those familiar with this art. After soldering, such a shank requires filing and polishing.

The principal aim of my invention is to effect a saving of time, labor and expense in manufacturing and assembling finger rings. Another object of my invention is to provide a method of locating and holding ornamental side pieces on a one piece ring shank in proper position for soldering thereto, without requiring the side pieces to be held in position by hand or by means of temporary wiring. A further object of my invention is to provide finger ring construction involving a one piece ring shank and separate ornamental side pieces, and inherently incorporating means for locating and holding the ornamental side pieces in proper position for soldering to the ring shank. A further object of my invention is to provide a method for producing finger rings quickly and inexpensively, both singly and in quantities; and the objects of my invention further include the provision of an integral blank adapted to yield a plurality of one piece ring shanks. Other objects of my invention will be in part obvious and in part pointed out hereinafter.

In accordance with my invention I provide a one piece ring shank and separate ornamental side pieces, the shank having properly located dents or recesses adapted to cooperate with projections on the ornamental side pieces permitting the projections on the side pieces to be sprung into the dents in the ring shank, and constituting self-sufficient means for locating and holding the side pieces on the shank in proper position for soldering thereto.

Figure 5:
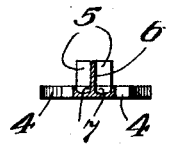
Figure 4:
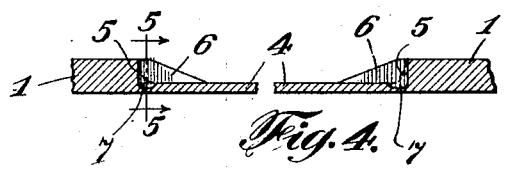
Figure 2:
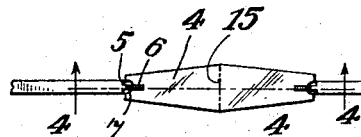
Figure 3:
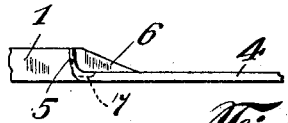
Figure 6:
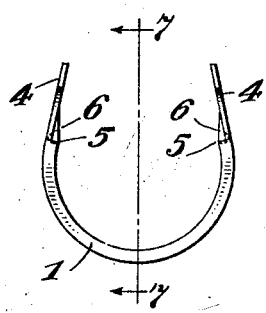
Figure 7:
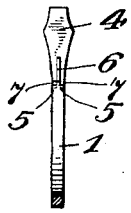
Figure 8:
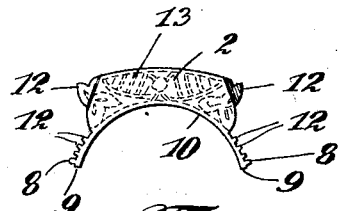
Figure 9:
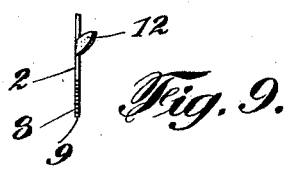

In order that a clearer understanding of my invention may be had attention is hereby directed to the accompanying drawings, forming a part of this application, and illustrating one possible embodiment of my invention. Referring to the drawing, Fig. 1 is a perspective view of a finger ring embodying my invention; Fig. 2 is a top view of a blank illustrating one possible method of producing a plurality of ring shanks from a single strip of metal; Fig. 3 is a side view of a fragment of said blank; Fig. 4 is a sectional view of the blank and is taken on the line 4—4 on Fig. 2; Fig. 5 is a transverse sectional view of the blank and is taken on the line 5—5 of Fig. 4; Fig. 6 is a side view of a one piece ring shank embodying my invention; Fig. 7 is a sectional view of the same and is taken on the line 7—7 of Fig. 6; Fig. 8 is a side view of one of the separate ornamental side pieces; and Fig. 9 is an end view of the same. Similar reference characters refer to similar parts throughout the several views of the drawings.

I shall first describe a finger ring embodying my invention and later shall describe the method of manufacturing and assembling the same. Referring to the drawings, the ring construction includes a complete ring shank 1, suitably shaped, and separate ornamental side pieces, such as 2, secured to the ring shank, and, if desired, a jewel supporting top piece 3 may be mounted on the side piece 2 and the ends of the ring shank 1. The ends of the ring shank 1 are flattened as at 4, the flattened portions 4 preferably beginning abruptly, forming inwardly extending shoulders 5 on the interior of the ring shank. A central reinforcing rib or fin 6 extends from each shoulder 5 for a distance along a flattened end 4, these fins preferably tapering from the shoulder. On each side of each fin 6 close to a shoulder 5 there is formed a slight recess or indentation 7, each indentation being adapted to receive one of the projections 8 which are present on the sides of the side pieces 2 near their lower ends. Preferably the distance between the opposite projections 8 of each side piece are slightly greater than the distance between the opposite dents 7 in the ring shank so that when the projections 8 of a side piece are in the opposite dents 7 of the ring shank the side pieces are held in the desired position on the ring shank. When so positioned the extremities 9 of the side pieces 2 rest upon opposite shoulders 5 of the ring shank, which constitute seats therefor. Preferably, when assembled, the inner periphery 10 of each side piece 2 is adapted to be an even continuation of the inner periphery 11 of the ring shank at its edges. Each side piece 2 is provided with side portions such as 12 which are adapted to rest against the edges of the shank ends 4 and to which these portions 12 may be soldered. The ends of the side pieces may also be soldered at the shoulders 5, as at 16. Ornamentation such as 13 may be placed on the side pieces, and, if desired, the flattened ends 4 of the shank may also carry ornamentation, as at 14.

Ring shanks as above described may be produced satisfactorily by a stamping operation. For quantity production I have found it economical to take a length of wire, either round or square, as desired, and flatten the wire at spaced intervals in such a way that each flattened portion constitutes two shank ends, such as 4, integral with each other at their ends. The shoulders 5 and fins 6 may be formed simultaneously with the forming of the flattened portions, and the dents 7 may be formed at the same time or later. Such a blank may be produced by a stamping operation. A blank so formed incorporates a plurality of ring shanks joined integrally together end to end. The ring shanks may be separated from each other by cutting the blank across the center of each flattened portion as indicated at 15. The ornamentation 14 may be placed on the shank ends 4 either during or after the stamping of the blank, as desired. When a single shank has been separated from the blank it can be bent to final shape in the usual manner. Two previously formed ornamental side pieces 2 are now positioned on the ring shank by interlocking their projections 8 with the dents 7 provided therefor in the ring shank. The side pieces 2 are thereby located and retained in proper position on the shank and may be readily and easily soldered thereto without necessitating their being held in place by temporary wiring or by other extraneous means. When the side pieces have been secured permanently to the ring shank a jewel supporting top plate 3 or the like may be mounted in place in any usual manner, as by soldering to the side pieces and shank ends.

By providing means inherent to the side pieces and ring shank whereby the side pieces are located and held in position on the ring shank for soldering thereto without requiring outside aid, considerable saving of time, labor and expense in manufacturing and assembling the rings is effected, and at the same time the advantages of the one-piece shank construction are retained. My improved finger ring, and the method of constructing and assembling the same, also incorporate many other advantages and benefits which will be readily apaprent to persons skilled in this art, and some of which have been pointed out heretofore.

As many changes could be made in the above construction, and as many apparently widely different embodiments thereof could be made without departing from the scope of this invention, it is intended that all matter contained in the above description or shown in the accompanying drawings shall be interpreted as illustrative and not in a limiting sense.

What I claim is:—

1. In finger ring construction, a ring shank, and an ornamental side piece, said shank and side piece having cooperating elements to hold said side piece self-retainable in a predetermined position against the side of the ring shank.

2. In finger ring construction, a ring shank having forged dents in the body thereof, and an ornamental side piece engaging in the dents of the shank, whereby said side piece is self-retained in a predetermined position on the ring shank.

3. In finger ring construction, a ring shank having forged dents in the body thereof, and an ornamental side piece having projections engaging in the dents of the shank, whereby the side piece is self-retained in a predetermined position on the ring shank.

4. In finger ring construction, a ring shank having forged dents in the body thereof, and ornamental side pieces self-retainable on opposite sides of the ring shank in proper position for being soldered thereto to form therewith a ring mounting.

5. In finger ring construction, a ring shank having separated ends, and an ornamental side piece, and cooperating means forged in the body of the ring shank and in the body of the side piece, whereby the side piece is self-retainable in a predetermined position against the side of the ring shank between the separated ends thereof.

6. In finger ring construction, a ring shank portion, a separate ornamental side piece, said parts having inter-engaging projections and recesses constituting means whereby the side pieces are located and retained in a pre-determined position on the ring shank portion.

7. In finger ring construction, a ring shank portion, a separate ornamental side piece, said parts having inter-engaging projections and recesses constituting means whereby the side pieces are located and retained in a pre-determined position on the ring shank portion, said ring shank portion having shoulders constituting seats for the extremities of the side piece.

8. In finger ring construction, a ring shank portion, a separate ornamental side piece, said parts having inter-engaging projections and recesses constituting means whereby the side pieces are located and retained in a pre-determined position on the ring shank portion, said ring shank portion having shoulders constituting seats for the extremities of the side piece, and integral reinforcing fins on the shank portion extending upwardly from said shoulders.

9. In finger ring construction, a one piece ring shank having inwardly disposed shoulders and flattened ends extending from the shoulders, and central reinforcing fins extending from said shoulders along said flattened portions, and side piece locating dents in the shank adjacent said shoulders and fins.

10. In finger ring construction, a one piece ring shank having side piece locating and retaining indentations forged in the body of the shank.

11. In finger ring construction, a one piece ring shank having inwardly disposed shoulders and flattened ends extending from the shoulders, central reinforcing fins extending from said shoulders along said flattened portions, and side piece locating and retaining dents forged in the body of the shank adjacent said shoulders and fins, and two ornamental side pieces, one on each side of the shank and each extending from one of said flattened shank portions to the other, each side piece having projections located in the said dents in said shank and having their extremities adjacent said shoulders, and their side edges abutting said flattened shank portions.

12. In finger ring construction, a blank comprising a length of wire having flattened portions at spaced intervals therealong, said blank incorporating a plural number of one-piece ring shanks, and each flattened portion incorporating a flattened end portion of each of two different ring shanks, said end portions being adapted to be separated from each other by cutting the flattened blank portions transversely across the center and side piece locating and retaining indentations located in said flattened portion.

13. In finger ring construction, a blank comprising a length of wire having flattened portions at spaced intervals therealong, said blank incorporating a plural number of one-piece ring shanks and each flattened portion incorporating a flattened end portion of each of two different ring shanks, said end portions being adapted to be separated from each other by cutting the flattened portions transversely across the center, said flattened portions beginning abruptly at shoulders, there being fins extending from the shoulders for a distance along said flattened portions and side piece locating and retaining indentations located in said flattened portion.

14. The method of producing finger rings, which includes, providing an integral metallic blank having a shank portion and dents forged in the body of the shank, and bending said blank to shape said shank portion into a complete one-piece ring shank and to position said dents for holding and supporting a side piece on the shank portion.

15. The process of manufacturing rings, which consists of forming a shank so that the free ends are of decreased thickness than the body thereof, forming dents therein, cutting and shaping a piece of metal and interfitting the shaped piece of metal between the ends of the shank so as to be self-retained thereon to form therewith a crown or gem setting.

16. The process of manufacturing rings, which consists of forming a shank so that the free ends are of decreased thickness than the body thereof, forming dents therein, cutting and shaping a piece of metal and interfitting the shaped piece of metal between the ends of the shank so as to be self-retained thereon to form therewith a crown or gem setting, and soldering the shaped piece of metal to said shank.

This specification signed this 15th day of December, 1923.

THOMAS MOUNTFORD.